United States Patent
Petersen (10) Patent No.: US 10,811,974 B1
(45) Date of Patent: Oct. 20, 2020

(54) POWER CONVERTER

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/386,735

(22) Filed: Apr. 17, 2019

(51) Int. Cl.
*H02M 3/158* (2006.01)
*H02M 3/155* (2006.01)

(52) U.S. Cl.
CPC .. *H02M 3/1582* (2013.01); *H02M 2003/1552* (2013.01)

(58) Field of Classification Search
CPC ....... H02M 3/07; H02M 3/073; H02M 3/1582
USPC ................ 363/59–60; 307/107–110
See application file for complete search history.

(56) References Cited

U.S. PATENT DOCUMENTS

| | | |
|---|---|---|
| 7,230,405 B2 | 6/2007 | Jang et al. |
| 9,768,682 B2 | 9/2017 | Banag |
| 10,218,255 B1 | 2/2019 | Petersen |
| 10,256,729 B1 | 4/2019 | Notsch |
| 10,291,117 B2 | 5/2019 | Petersen |
| 2008/0079393 A1 | 4/2008 | Spartano et al. |
| 2008/0157732 A1 | 7/2008 | Williams |
| 2008/0158915 A1 | 7/2008 | Williams |
| 2009/0033289 A1 | 2/2009 | Xing et al. |
| 2009/0174466 A1 | 7/2009 | Hsieh et al. |
| 2010/0188065 A1 | 7/2010 | Shiwaya |
| 2011/0062940 A1 | 3/2011 | Shvartsman |
| 2013/0147543 A1 | 6/2013 | Dai et al. |
| 2014/0070787 A1 | 3/2014 | Arno |
| 2015/0061613 A1 | 3/2015 | Kondou |
| 2015/0280553 A1 | 10/2015 | Giuliano et al. |
| 2015/0311793 A1 | 10/2015 | Khayat et al. |
| 2016/0344214 A1* | 11/2016 | Petersen ............... H02J 7/00 |
| 2017/0244318 A1* | 8/2017 | Giuliano ............. H02M 3/07 |
| 2017/0302093 A1* | 10/2017 | Petersen ............ H02J 2207/20 |
| 2018/0175726 A1 | 6/2018 | Petersen et al. |

OTHER PUBLICATIONS

USPTO Office Action, U.S. Appl. No. 16/386,770, Applicant: Petersen, Holger, dated Oct. 17, 2019, 18 pages.
USPTO Office Action, U.S. Appl. No. 16/386,761, Applicant: Petersen, Holger, dated Oct. 1, 2019, 18 pages.

(Continued)

*Primary Examiner* — Nguyen Tran
(74) *Attorney, Agent, or Firm* — Saile Ackerman LLC; Stephen B. Ackerman (57) ABSTRACT

A hybrid power converter and a method with low power losses over an extended conversion range are presented. The converter maintains low conversion losses associated with reduced inductor ripples not only for a single conversion ratio, but over a wide range of conversion ratios. The power converter has a ground terminal, an input terminal for receiving an input voltage and an output terminal for providing an output voltage with a target conversion ratio. The power converter has an inductor; a first flying capacitor selectively coupled to the inductor; a second flying capacitor selectively coupled to the inductor; a network of switches; and a driver adapted to operate the converter in a first mode associated with a first range of conversion ratios.

22 Claims, 11 Drawing Sheets

(56) References Cited

OTHER PUBLICATIONS

"Multi-Level Conversion: High Voltage Choppers and Voltage-Source Inverters," by T.A. Meynard et al, PESC '92 Record, 23rd Annual IEEE Power Electronics Specialists Conference, Jun. 29-Jul. 3, 1992, pp. 397-403.

"Three-Level Buck Converter for Envelope Tracking Applications," by Vahid Yousefzadeh et al., IEEE Transactions on Power Electronics, vol. 21, No. 2, Mar. 2006, pp. 549-552.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Zero Inductor Voltage Multilevel Bus Converter," by Samuel Webb et al. 2018 IEEE Applied Power Electronics Conference and Exposition (APEC), Mar. 4-8, 2018, pp. 2175-2182.

"A Hybrid Inductor-Based Flying-Capacitor-Assisted Step-Up/Step-Down DC-DC Converter with 96.56% Efficiency," by Yong-Min Ju et al., 10.4, 2017 IEEE International Solid-State Circuits Conference, Feb. 5-9, 2017, pp. 184-186.

"A Hybrid Dual-Path Step-Down Converter with 96.2% Peak Efficiency Using a 250mΩ Large-DCR Inductor," by Yeunhee Huh et al., 2018 Symposium on VLSI Circuits, Jun. 18-22, 2018, pp. 225-226.

"A Hybrid Structure Dual-Path Step-Down Converter with 96.2% Peak Efficiency Using a 250-mΩ Large-DCR Inductor," by Yuenhee Huh et al., IEEE Journal of Solid-State Circuits, vol. 54, No. 4, Apr. 219, pp. 959-967.

"Split-Phase Control: Achieving Complete Soft-Charging Operation of a Dickson Switched-Capacitor Converter," by Yutian Lei et al., IEEE Transactions on Power Electronics, vol. 31, No. 1, Jan. 2016, pp. 770-782.

"Fully Inegrated Buck Converter with 78% Efficiency at 365 mW Output Power Enabled by Switched-Inductor-Capacitor Topology and Inductor Current Reduction Technique," by Nghia Tang et al., 2019 IEEE International Solid-State Circuits Conference—(ISSCC), Feb. 2019, pp. 152-154.

Notice of Allowance, U.S. Appl. No. 16/386,770, First Named Inventor: Holger Petersen, dated Apr. 20, 2020, 14 pages.

Co-pending US Patent, U.S. Appl. No. 16/386,770, filed Apr. 17, 2019 "A Power Converter," by Holger Petersen, 26 pgs.

Co-pending US Patent, U.S. Appl. No. 16/386,761, filed Apr. 17, 2019, "A Multi-Level Power Converter," by Holger Petersen, 30 pgs.

PTO Office Action, U.S. Appl. No. 16/386,761, Applicant: Petersen, Holger, dated Feb. 10, 2020, 14 pgs.

\* cited by examiner

POWER CONVERTER

RELATED PATENT APPLICATIONS

This application is related to application Ser. No. 16/386,761, filed on Apr. 17, 2019, and to application Ser. No. 16/386,770, filed on Apr. 17, 2019, assigned to a common assignee, and which are incorporated by reference in their entirety.

TECHNICAL FIELD

The present disclosure relates to a power converter and a method of operating the same. In particular, the present disclosure relates to a hybrid power converter with low power losses over an extended conversion range.

BACKGROUND

In recent years, portable computing devices including smartphones, tablets and notebooks have increased their computing power, screen resolution and display frame rate. These advancements have been enabled by sub-micron range silicon technology approaching 10 nm and below and allowing the formation of ultra-narrow gate structures. Ultra-narrow gate structures exhibit increased leakage current for each transistor.

In view of the fact that central processing units (CPUs) and graphical processing units (GPUs) are composed from multiple hundred million transistors, the leakage current of a modern microprocessor is significant. To reduce battery consumption, the embedded computing cores are typically disconnected from the power supply as often as possible. As a result, the required computing power is provided within short bursts of operation. Hence, the power profile of a modern mobile computing device is dominated by relatively long periods of standby currents in the mA range, interrupted by pulses of high peak currents (in the 20 A and higher range). The challenge for a power management unit is the provision of low currents at high conversion efficiency to optimize battery life time, combined with the provision of high currents without saturation effects and at a stable output voltage.

Smartphones and tablet computers are typically powered with a Li-Ion battery pack having a nominal output voltage of 3.6V. The CPU and GPUs produced from silicon technology with gate lengths of 10 nm and below requires a supply voltage of about 0.9V. The corresponding voltage step-down converter needs to optimize its efficiency around a typical $V_{out}/V_{in}$ conversion ratio of 0.9V/3.6V=0.25 V.

Traditional 2-levels and 3 levels buck converters are limited by significant conversion losses spanning over a wide range of conversion ratios. The battery voltage of a typical Li-Ion battery cell may drop over the course of its use from 4.2V down to 2.5V. There is therefore a need for a converter that can maintain low conversion losses associated with reduced inductor ripples not only for a single conversion ratio, but over a wide range of conversion ratios.

SUMMARY

According to a first aspect of the disclosure, there is provided a power converter having a ground terminal, an input terminal for receiving an input voltage and an output terminal for providing an output voltage with a target conversion ratio, the power converter comprising an inductor; a first flying capacitor selectively coupled to the inductor; a second flying capacitor selectively coupled to the inductor; a network of switches; and a driver adapted to operate the converter in a first mode associated with a first range of conversion ratios; wherein in the first mode the driver is configured to drive the network of switches with a first sequence of states during a drive period, the first sequence of states comprising a first state and a second state, wherein in the first state one of the input terminal and the ground terminal is coupled to the output terminal via a first path comprising the second flying capacitor and which bypasses the inductor, and wherein the ground terminal is coupled to the output terminal via a second path comprising the first flying capacitor and the inductor; wherein in the second state the ground terminal is coupled to the output terminal via a third path comprising the first flying capacitor, the second flying capacitor and the inductor.

For example the first range of conversion ratios may be $V_{out}/V_{in} \leq 1/3$.

Optionally, the driver is adapted to operate the converter in a second mode associated with a second range of conversion ratios; wherein in the second mode the driver is configured to drive the network of switches with a second sequence of states, the second sequence of states comprising the first state, the second state, and a third state, wherein in the third state the input terminal is coupled to the output terminal via a path comprising the first flying capacitor and wherein the ground terminal is coupled to the output terminal via a path comprising the second flying capacitor and the inductor.

Optionally, in the third state the input terminal is coupled to the output terminal via a path comprising the first flying capacitor and the inductor.

For example the second range of conversion ratios may be $1/3 < V_{out}/V_{in} < 1/2$. The states in the second sequence of states may be provided in a specific order, for instance: first state/second state/third state/first state.

Optionally, the driver is adapted to operate the converter in a third mode associated with a third range of conversion ratios; wherein in the third mode the driver is configured to drive the network of switches with a third sequence of states, the third sequence of states comprising the first state and the third state.

For example the third range of conversion ratios may be $V_{out}/V_{in} \geq 1/2$.

Optionally, the first sequence comprises a de-magnetization state, in which the ground terminal is coupled to the output terminal via a de-magnetization path comprising the inductor. Additionally, in the de-magnetization state, the input terminal may be coupled to the output terminal via the first path.

The states in the first sequence may be provided in a specific order, for instance: first state/de-magnetization state/second state/de-magnetization state.

Optionally, the third sequence comprises a magnetization state, in which the input terminal is coupled to the output terminal via a magnetization path comprising the inductor. Additionally, in the magnetization state, the input terminal may be coupled to the output terminal via the first path.

The states in the third sequence may be provided in a specific order, for instance: first state/magnetization state/third state/magnetization state.

Optionally, the driver is adapted to change a first duration of the first state, a second duration of the second state and a third duration of the third state based on the target conversion ratio.

Optionally, the driver is adapted to change a duration of the magnetization state based on the target conversion ratio.

Optionally, the driver is adapted to change a duration of the de-magnetization state based on the target conversion ratio.

Optionally, the network of switches comprises a first input switch coupled to the input terminal; a second input switch to couple the first flying capacitor to the input terminal via the first input switch; a first ground switch to couple the first flying capacitor to ground; and a second ground switch to couple the second flying capacitor to ground; wherein the inductor has a first terminal and a second terminal the second terminal being coupled to the output terminal.

Optionally, each one of the first flying capacitor and the second flying capacitor has a first terminal selectively coupled to the input terminal and a second terminal selectively coupled to the ground; wherein the network of switches comprises a first capacitor switch coupled to the first terminal of the first flying capacitor; a second capacitor switch coupled to the second terminal of the first flying capacitor; and a fourth capacitor switch coupled to the second terminal of the second flying capacitor.

Optionally, the first terminal of the inductor is coupled to the first flying capacitor via the second capacitor switch and to the second flying capacitor via the fourth capacitor switch; and wherein the first capacitor switch is coupled to the output terminal.

Optionally, the network of switches comprises a third capacitor switch coupled to the first terminal of the second flying capacitor.

Optionally, the network of switches comprises a third input switch to couple the second flying capacitor to the input terminal via the first input switch.

Optionally, the first terminal of the inductor is coupled to the first flying capacitor via the first capacitor switch and the second capacitor switch; the first terminal of the inductor being coupled to the second flying capacitor via the third capacitor switch; and wherein the fourth capacitor switch is coupled to the output terminal.

Optionally, the first flying capacitor is coupled to the second terminal of the inductor via an output switch.

According to a second aspect of the disclosure, there is provided a method of converting an input voltage provided at an input terminal into an output voltage provided at an output terminal, the method comprising providing an inductor; providing a first flying capacitor selectively coupled to the inductor; providing a second flying capacitor selectively coupled to the inductor; providing a network of switches; operating the converter in a first mode associated with a first range of conversion ratios by driving the network of switches with a first sequence of states during a drive period, the first sequence of states comprising a first state and a second state, wherein in the first state one of the input terminal and the ground terminal is coupled to the output terminal via a first path comprising the second flying capacitor and which bypasses the inductor, and wherein the remaining terminal among the input terminal and the ground terminal is coupled to the output terminal via a second path comprising the first flying capacitor and the inductor; wherein in the second state the ground terminal is coupled to the output terminal via a third path comprising the first flying capacitor, the second flying capacitor and the inductor.

Optionally, the first sequence comprises a de-magnetization state, in which the ground terminal is coupled to the output terminal via a de-magnetization path comprising the inductor.

Optionally, the method comprises operating the converter in a second mode associated with a second range of conversion ratios by driving the network of switches with a second sequence of states, the second sequence of states comprising the first state, the second state, and a third state, wherein in the third state the input terminal is coupled to the output terminal via a path comprising the first flying capacitor and wherein the ground terminal is coupled to the output terminal via a path comprising the second flying capacitor and the inductor.

Optionally, in the third state the input terminal is coupled to the output terminal via a path comprising the first flying capacitor and the inductor.

Optionally, the method comprises operating the converter in a third mode associated with a third range of conversion ratios by driving the network of switches with a third sequence of states, the third sequence of states comprising the first state and the third state.

Optionally, the third sequence comprises a magnetization state, in which the input terminal is coupled to the output terminal via a magnetization path comprising the inductor.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DESCRIPTION

Figure 1A:
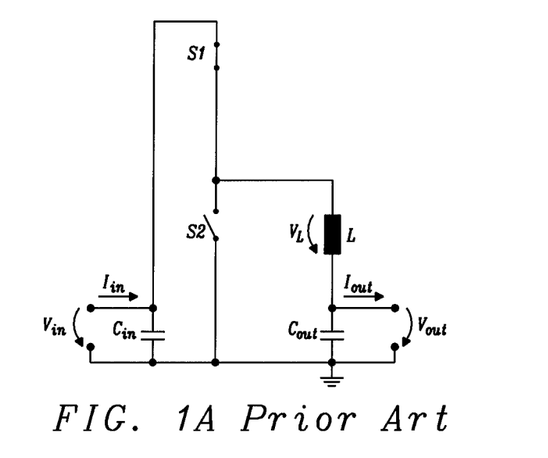
FIG. 1A is a diagram of a two-levels Buck converter.
Figure 1B:
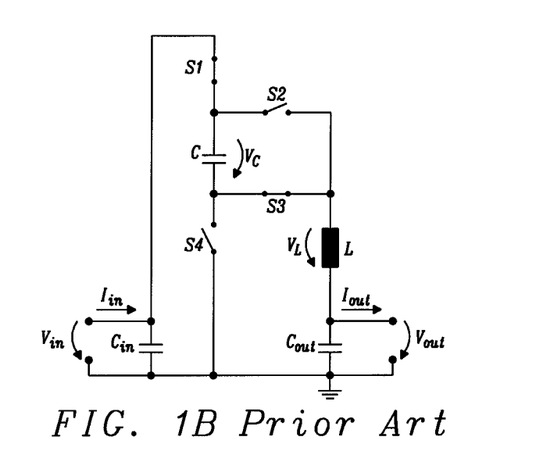
FIG. 1B is a diagram of a three-levels Buck converter.
Figure 1C:
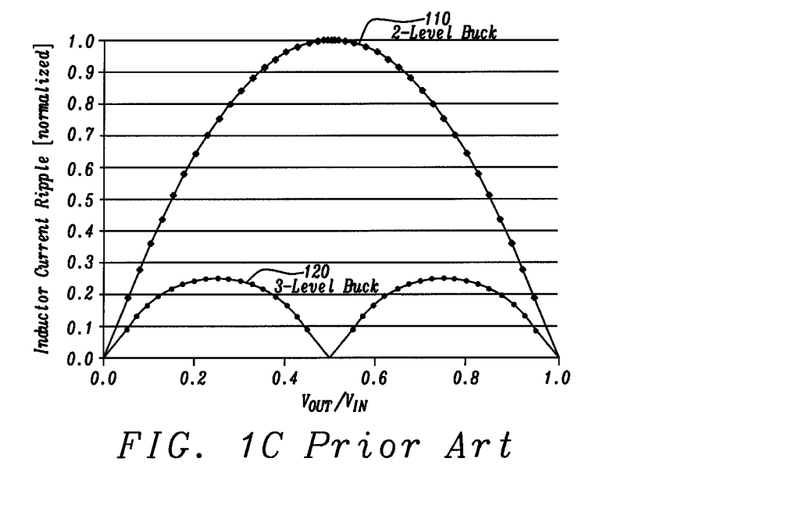
FIG. 1C is a simulation of the inductor current ripple of the converters of FIGS. 1A and 1B as a function of conversion ratio.

FIGS. 1A and 1B show the topologies of traditional two-levels and three-levels Buck converters. Such converters may be used to provide an output voltage over a range of conversion ratios. Conversion losses are proportional to the frequency of the inductor current ripple and to the square of the current ripple amplitude. Regulated switching DCDC converters may minimize conversion losses by lowering switching frequency and inductor current ripples. FIG. 1C is a simulation of the inductor current ripple as a function of conversion ratio obtained for the converters of FIGS. 1A and 1B.

The normalized inductor current ripple 110 and 120 are shown for the 2-Level Buck converter and the 3-level Buck converter respectively. For a conversion ratio $V_{out}/V_{in}$=0.25, the 2-Level Buck displays 75% of its peak inductor current ripple. This requires either high switching frequency which is reducing converter efficiency, or a large inductance hence a large inductor. For a given inductor form factor this would result in increased Direct Current Resistance (DCR) and increased conduction loss, ultimately reducing converter efficiency. Hybrid converter topologies such as the 3-levels Buck converter are typically reducing the inductor ripple at $V_{out}/V_{in}$, =0.25 by a factor 3. Compared with the 2-level Buck converter this corresponds to switching frequency that is three times lower or an inductance three times lower. However, for a conversion ratio $V_{out}/V_{in}$, =0.25, the inductor current ripple remains significant and is at its highest amplitude for the 3-Level Buck converter topology.

Figure 2A:
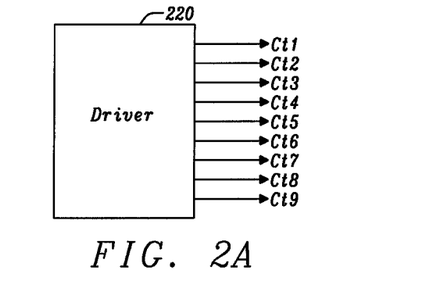
FIG. 2 is a diagram of a DC-DC converter according to the disclosure.
Figure 2B:
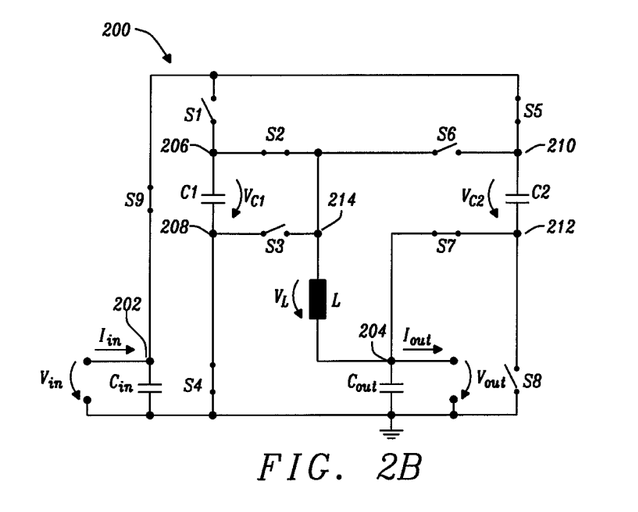

FIG. 2 is a diagram of a DC-DC converter 200 according to the disclosure. The DC-DC converter 200 includes two capacitors C1 and C2 and an inductor L coupled between an input node 202 and an output node 204 via a network of switches formed by nine switches S1, S2, S3, S4, S5, S6, S7, S8 and S9. An input capacitor Cin is provided between the input node 202 and ground and an output capacitor Cout is provided between the output node 204 and ground. The capacitors Cin and Cout are connected to a fixed ground voltage and may be referred to as reservoir capacitors. The capacitors C1 and C2 have terminals provided with varying voltages and may be referred to as flying capacitors.

The first flying capacitor C1 is coupled to ground via the switch S4 and to the input node 202 via the switches S1 and S9. Similarly, the second flying capacitor C2 is coupled to ground via the switch S8 and to the input node 202 via the switches S5 and S9. The first flying capacitor C1 has a first terminal coupled to node 206 and a second terminal coupled to node 208. The second flying capacitor C2 has a first terminal coupled to node 210 and a second terminal coupled to node 212. The second flying capacitor C2 is also coupled to the output node 204 via the switch S7. The inductor L has a first terminal at node 214 and a second terminal coupled to the output node 204. The first terminal at node 214 is coupled to node 206 via the switch S2, to node 210 via the switch S6, and to node 208 via switch S3. A driver 220 is provided to generate a plurality of control signals Ct1-Ct9 to operate the switches S1-S9 respectively.

The topology of the converter 200 is referred to as an asymmetric topology as the voltage across C1 may be different from the voltage across C2. The voltage across C2 is $V_{in}-V_{out}$, while the voltage across C1 may take different values depending on the conversion ratio selected. A continuous input current may be achieved when C1 is charged to about $V_{out}$.

The DC-DC converter is operable in three modes referred to as first, second and third modes and corresponding to three different ranges of conversion ratios. The first mode corresponds to a conversion ratio range or $$\frac{V_{in}}{V_{out}} \geq 3 \text{ or } \frac{V_{out}}{V_{in}} \leq 0.33.$$

In order to limit the inductor current ripples in this conversion range, the voltage across the flying capacitor C1 may be regulated to $V_{c1} \sim (V_{in}-V_{out})/2$. For minimum voltage across the switches S2 and S3 the flying capacitor C1 may alternatively be regulated e.g. to $V_{C1} \sim V_{out}$. In this case the inductor core loss is slightly increased, for instance to twice the current ripple amplitude at half the frequency. The second mode corresponds to a conversion ratio range of $$2 \leq \frac{V_{in}}{V_{Out}} \leq 3 \text{ or } 0.33 \leq \frac{V_{out}}{V_{in}} \leq 0.5.$$

In this second mode the voltage across the flying capacitor C1 becomes $V_{C1} \sim$Vout. The third mode corresponds to a conversion ratio range of $$\frac{V_{in}}{V_{out}} \leq 2 \text{ or } \frac{V_{out}}{V_{in}} \geq 0.5.$$

In the third mode the voltage across the flying capacitor C1 becomes $V_{C1} \sim V_{out}$.

The driver 220 operates the converter 200 using a sequence of two or three states selected among a plurality of states depending on the chosen mode of operation. The states may be selected among five states labelled as states A, B, C, D and E.

Figure 3A:
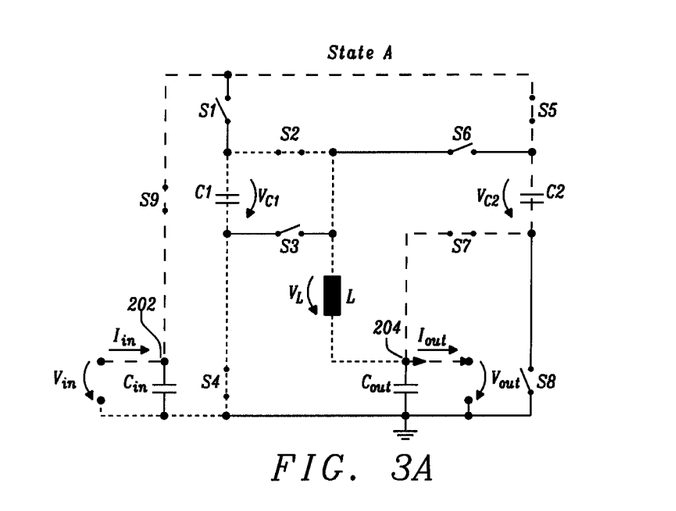
FIG. 3A is a diagram of the DC-DC converter of FIG. 2 operating in a first state.

FIG. 3A illustrates the DC-DC converter of FIG. 2 operating in a first state referred to as state A. In state A the switches S2, S4, S5, S7 and S9 are closed while the remaining switches S1, S3, S6 and S8 are open. The input node 202 is coupled to the output node 204 via a first path comprising S9, S5, C2, and S7, hence bypassing inductor L. The ground is coupled to the output node 204 via a second path comprising S4, C1, S2 and L.

Figure 3B:
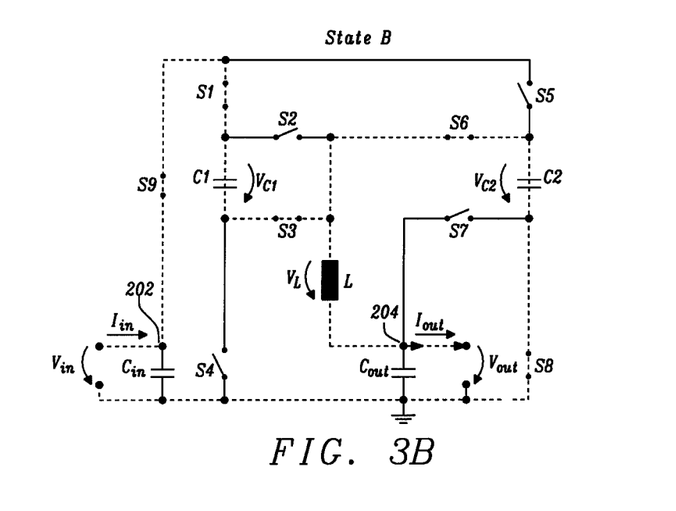
FIG. 3B is a diagram of the DC-DC converter of FIG. 2 operating in second state.

FIG. 3B illustrates the DC-DC converter of FIG. 2 operating in a second state referred to as state B. In state B the switches S1, S3, S6, S8 and S9 are closed while the remaining switches S2, S4, S5 and S7 are open. The input node 202 is coupled to the output node 204 via a third path comprising S9, S1, C1, S3 and L. The ground is coupled to the output node 204 via a fourth path comprising S8, C2, S6 and L.

Figure 3C:
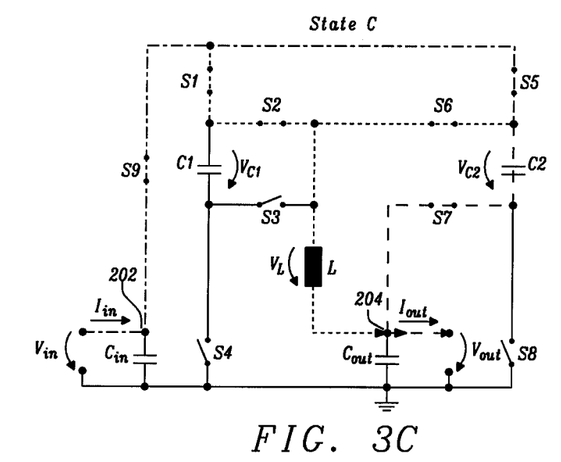
FIG. 3C is a diagram of the DC-DC converter of FIG. 2 operating in an intermediate magnetization state.

FIG. 3C illustrates the DC-DC converter of FIG. 2 operating in a third state referred to as state C or magnetization state. In state C the switches S1, S2, S5, S6 and S9 are closed while the remaining switches S3, S4, S8 are open. The switch S7 may be closed or not. The input is coupled to the output via a fifth dual-path comprising S9, S1, S2, L and S9, S5, S6, L respectively. When S7 is closed, the input node 202 is also coupled to the output node 204 via the first path (S9, S5, C2, S7).

Figure 3D:
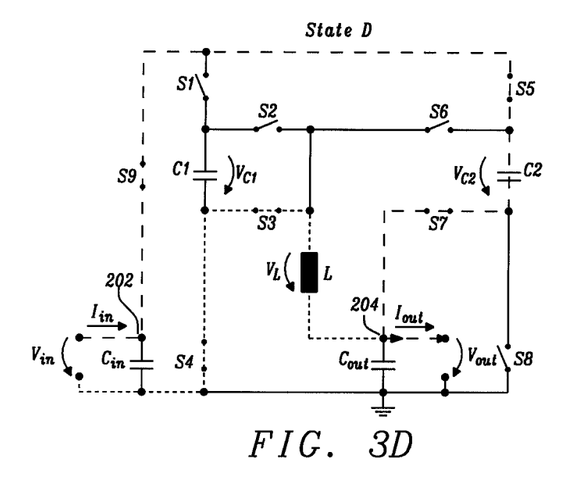
FIG. 3D is a diagram of the DC-DC converter of FIG. 2 operating in an intermediate de-magnetization state.

FIG. 3D illustrates the DC-DC converter of FIG. 2 operating in a fourth state referred to as state D or de-magnetization state. In state D the switches S3, S4, S5 and S9 are closed while the remaining switches S1, S2, S6 and S8 are open. The switch S7 may be closed or not. The ground is coupled to the output node 204 via a sixth path that includes S4, S3 and L. When S7 is closed, the input node 202 is also coupled to the output node 204 via the first path (S9, S5, C2, S7).

Figure 3E:
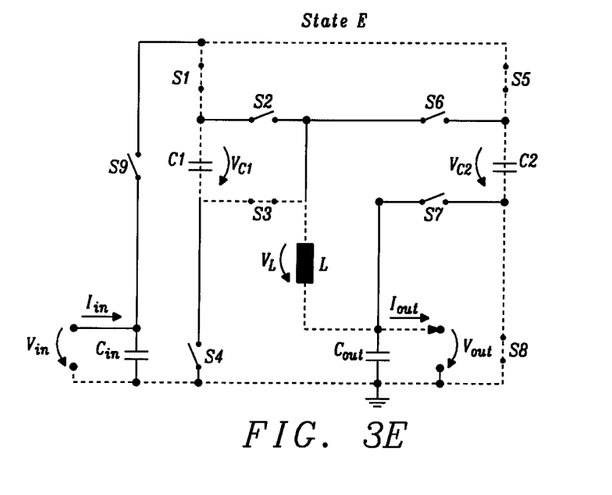
FIG. 3E is a diagram of the DC-DC converter of FIG. 2 operating in another state.

FIG. 3E illustrates the DC-DC converter of FIG. 2 operating in a fifth state referred to as state E. In state E the switches S1, S3, S5 and S8 are closed while the remaining switches S2, S4, S6, S7 and S9 are open. The ground is coupled to the output node 204 via a seventh path that includes S8, C2, S5, S1, C1, S3 and L.

For each mode of operation, the driver may select a specific sequence of states. In the first mode associated with a conversion ratio $$\frac{V_{out}}{V_{in}} \le 0.33,$$

a first mode sequence includes States A, E and optionally D. For a target conversion ratio of 1/3, the first mode sequence would only include states A and E. However, for conversions ratios lower than 1/3 the first mode sequence would also include state D. These states may be provided in a specific order, for instance A/D/E/D.

In the second mode of operation associated with the conversion ratio ranging $$0.33 < \frac{V_{out}}{V_{in}} < 0.5,$$

a second mode sequence includes states A, E and B. These states may be provided in a specific order, for instance A/E/B/A.

In the third mode of operation associated with the conversion ratio $$\frac{V_{out}}{V_{in}} \ge 0.5,$$

a third mode sequence includes States A, B and optionally C. These states may be provided in a specific order, for instance A/C/B/C.

Figure 4:
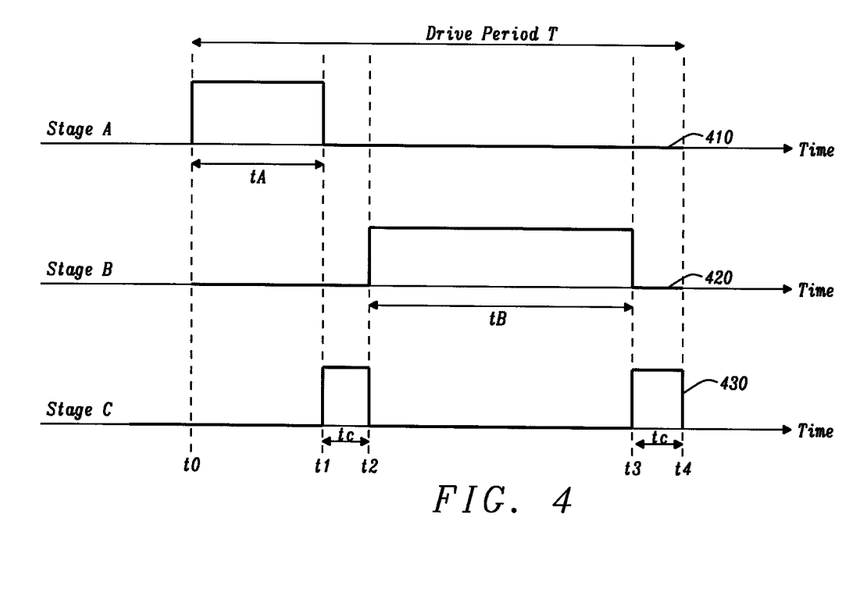
FIG. 4 is an exemplary drive sequence for operating the DC-DC converter of FIG. 2.

FIG. 4 illustrates an exemplary drive sequence for operating the DC-DC converter of FIG. 2 in the third mode. The driver drives the DC-DC converter with state A (waveform 410), between the times t0 and t1 for a duration TA, with state C (waveform 430) between the times t1 and t2 for a duration TC, with state B (waveform 420) between the times t2 and t3 for a duration TB, and then with state C between the times t3 and t4. This sequence is then repeated over time to deliver the required output power. It will be appreciated that a dead-time may be introduced at times t1, t2, t3 and t4. The values of durations TA, TB and TC, also referred to as state duty cycle, may vary depending on the target conversion ratio. The state durations must also satisfy the volt second balance across the inductor.

The voltage across the flying capacitor C1 is $V_{C1} \sim V_{out}$. For continuous switching, and in order to satisfy the Volt x second balance across the inductor L, the duration of the switching state TB needs to be longer than TA. For a balanced average current through both switching phases (C1 and C2) the duration ratio TB/TA is 2:1. For a conversion ratio $$\frac{V_{out}}{V_{in}} = 0.5,$$

TC=0 and TB=L TA. The topology of the DCDC converter of FIG. 2 may be modified to improve performance in a specific conversion range.

Figure 5:
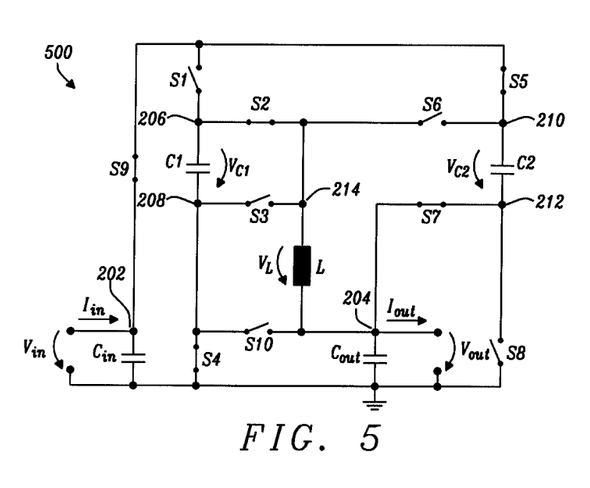
FIG. 5 is a diagram of another DC-DC converter according to the disclosure.

FIG. 5 illustrates a diagram of a DC-DC converter 500 designed for minimizing inductor core and conduction losses when operating with an output voltage $$\frac{V_{out}}{V_{in}} > \frac{1}{2}.$$

The converter 500 is similar to the converter 200 described with reference to FIG. 2, in which certain parts of the circuit have been added or modified. The same reference numerals have been used to represent corresponding components and their description will not be repeated for sake of brevity.

In this embodiment, another switch S10 is provided. The switch S10 has a first terminal coupled to the first flying capacitor at node 208 and a second terminal coupled to the output node 204.

In the third mode of operation associated with the conversion ratio $$\frac{V_{out}}{V_{in}} \ge 0.5,$$

the DC-DC converter 500 may be operated with a sequence of modes that includes states A, F and optionally C. These states may be provided in a specific order, for instance A/C/F/C. Stated another way, the state F is replacing the state B described above with reference to FIG. 3B.

Figure 6:
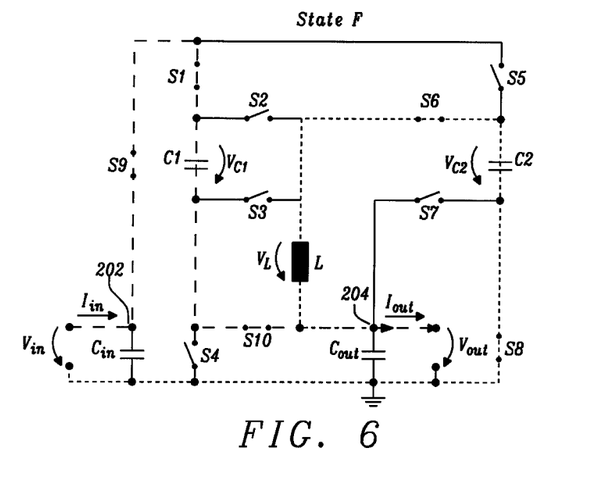
FIG. 6 is a diagram of the DC-DC converter of FIG. 5 operating in an intermediate state.

FIG. 6 is a diagram of the DC-DC converter of FIG. 5 operating in a main state F. In state F the switches S1, S6, S8, S9 and S10 are closed while the remaining switches S2, S3, S4, S5 and S7 are open. The input node 202 is coupled to the output node 204 via a path comprising S9, S1, C1 and S10. The ground is coupled to the output node 204 via a path comprising S8, C2, S6 and L. In the states A and C the switch S10 remains open. The voltage across the flying capacitor C1 of converter 500 becomes $V_{C1} \sim V_{in} - V_{out}$ and the duration TF of the switching state F may be the same as the duration TA of the switching state A.

Figure 7:
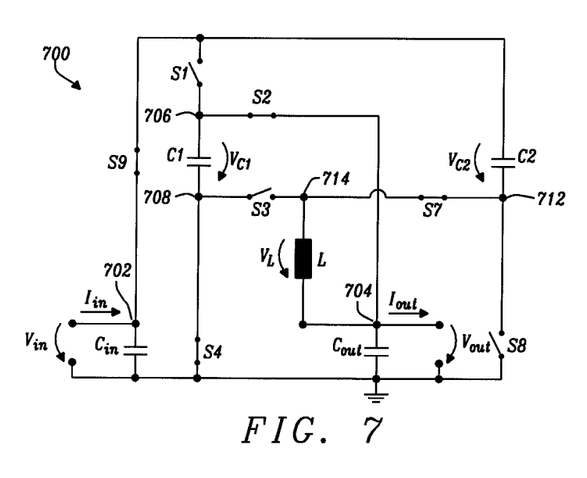
FIG. 7 is a diagram of yet another DC-DC converter according to the disclosure.

FIG. 7 illustrates a diagram of a DC-DC converter 700 designed for minimizing conduction losses when operating with an output voltage $$\frac{V_{out}}{V_{in}} \le \frac{1}{3}.$$

The converter 700 includes two flying capacitors C1 and C2, an inductor and a network of only seven switches S1, S2, S3, S4, S7, S8 and S9. An input capacitor Cin is provided between the input node 702 and ground and an output capacitor Cout is provided between the output node 704 and ground. The first flying capacitor C1 is coupled to ground via the switch S4 and to the input node 702 via the switches S1 and S9. Similarly, the second flying capacitor C2 is coupled to ground via the switch S8 and to the input node 202 via the switch S9. The first flying capacitor C1 has a first terminal coupled to the output via S2 and a second terminal coupled to inductor L via S3. The second flying capacitor C2 is coupled to L via the switch S7. The inductor L has a first terminal at node 714 and a second terminal coupled to the output node 704.

The converter 700 is operated with a sequence of states comprising: state A', state E and $$\left(\text{for a conversion ratio}\frac{V_{out}}{V_{in}}<\frac{1}{3}\right)$$

state D. In state A' the switches S2, S4, S7 and S9 are closed while the remaining switches S1, S3 and S8 are open.

The input node 702 is coupled to the output node 704 via a first path comprising S9, C2, S7 and L. The ground is coupled to the output node 704 via a second path comprising S4, C1, S2, hence bypassing L.

The DC-DC converters described in relation to FIGS. 2 to 7 have been described as step-down converters also referred to as Buck converters. It will be appreciated that these converters may be operated in reverse (that is using the input as the output and the output as the input) as Boost converters to achieve step-up conversion.

Figure 8:
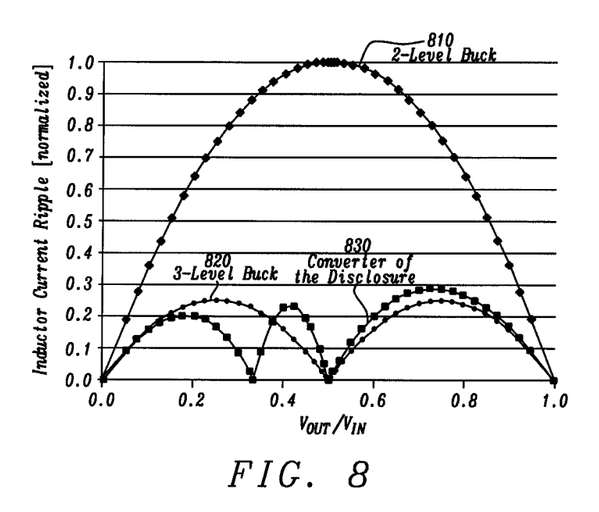
FIG. 8 is a simulation of the inductor current ripple of the converters of FIGS. 1A, 1B and 2 as a function of conversion ratio.

FIG. 8 shows the simulations of the inductor current ripples of a 2-level Buck converter 810, a 3-level Buck converter 820 and the converter according to the disclosure 830, as a function of conversion ratios. The converter according to the disclosure extends the maximum converter output current above the maximum current rating of the inductor and reduces inductor conduction loss via an output current paths that is bypassing the inductor (up to 33% of $I_{out}$). The converter of the disclosure also provides an additional conversion range with reduced inductor current ripple around the ratio $V_{out}/V_{in}=0.33$.

Figure 9:
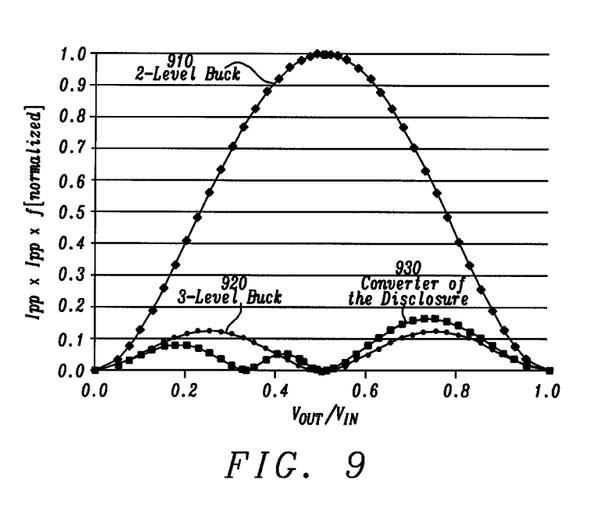
FIG. 9 is a simulation of the inductor core power loss of the converters of FIGS. 1A, 1B and 2 as a function of conversion ratio.

FIG. 9 shows the simulations of the inductor core power loss of a 2-level Buck converter 910, a 3-level Buck converter 920 and the converter according to the disclosure 930, as a function of conversion ratios. Typical inductor power loss, based on the Steinmetz equation, is proportional to the frequency of the inductor current ripple and to the square of the current ripple amplitude $I_{pp}$. For a conversion ratio $V_{out}/V_{in}>0.5$ the frequency of inductor current ripple of a 3-Level Buck Converter and of the converter of the disclosure is about twice the frequency of the 2-Level Buck Converter. The inductor current ripple is twice the frequency of the 2-Level Buck converter below $V_{out}/V_{in}=0.5$ for the 3-Level Buck Converter and below $V_{out}/V_{in}=0.33$ for the invented converter topology. FIG. 9 presents the normalized loss comparison based on these two parameters.

In an extended conversion range spanning from $V_{out}/V_{in}>0.25$ up to $V_{out}/V_{in}>0.5$ the normalized inductor core loss 930 of a converter according to the disclosure is less than ~5% of the losses 910 of a traditional 2-Level Buck Converter. The 3-Level Buck Converter implements a low inductor core loss 920 only around $V_{out}/V_{in}\sim 0.5$.

Figure 10:
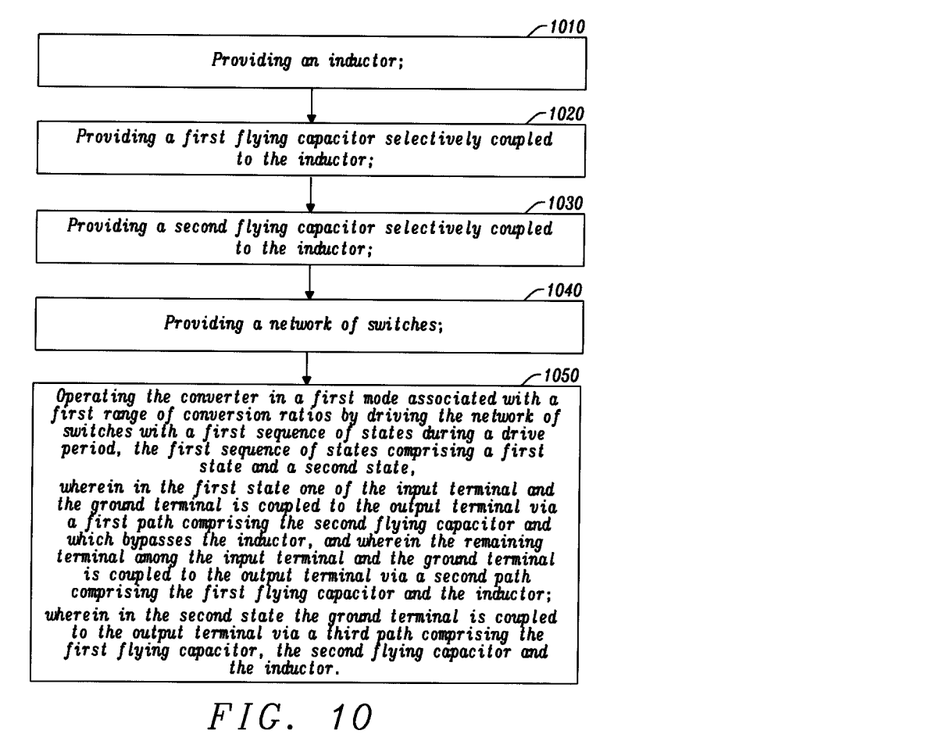
FIG. 10 is a flow chart of a method for converting power with a target conversion ratio.

FIG. 10 is a flow chart of a method for converting an input voltage provided at an input terminal into an output voltage provided at an output terminal, with a target conversion ratio. At step 1010 an inductor is provided. At step 1020 a first flying capacitor selectively coupled to the inductor is provided. At step 1030 a second flying capacitor selectively coupled to the inductor is provided. At step 1040 a network of switches is provided. At step 1050 the converter is operated in a first mode associated with a first range of conversion ratios by driving the network of switches with a first sequence of states during a drive period. The first sequence of states comprises a first state and a second state. In the first state one of the input terminal and a ground terminal is coupled to the output terminal via a first path comprising the second flying capacitor and which bypasses the inductor, and the remaining terminal among the input terminal and the ground terminal is coupled to the output terminal via a second path comprising the first flying capacitor and the inductor. In the second state the ground terminal is coupled to the output terminal via a third path comprising the first flying capacitor, the second flying capacitor and the inductor.

A skilled person will appreciate that variations of the disclosed arrangements are possible without departing from the disclosure. For instance the flying capacitors may be implemented as single or multiple capacitors connected in series and/or in parallel. Alternatively a capacitor network may be used. Such a capacitor network may change configuration during the operation of the converter. Accordingly, the above description of the specific embodiment is made by way of example only and not for the purposes of limitation. It will be clear to the skilled person that minor modifications may be made without significant changes to the operation described.

What is claimed is:

1. A power converter for providing an output voltage with a target conversion ratio, the power converter having a ground terminal, a first port and a second port, wherein when the power converter operates as a step-down converter the first port receives an input voltage and the second port provides the output voltage and when the power converter operates as a step-up converter the second port receives an input voltage and the first port provides the output voltage; the power converter further comprising
   an inductor;
   a first flying capacitor selectively coupled to the inductor;
   a second flying capacitor selectively coupled to the inductor;
   a network of switches; and
   a driver adapted to operate the converter in a first mode associated with a first range of conversion ratios; wherein in the first mode the driver is configured to drive the network of switches with a first sequence of states during a drive period, the first sequence of states comprising a primary state and a first additional state,
   wherein in the primary state one of the first port and the ground terminal is connected to the second port via a first current path comprising the second flying capacitor and which bypasses the inductor, and wherein the remaining terminal among the first port and the ground terminal is connected to the second port via a second current path comprising the first flying capacitor and the inductor;
   wherein in the first additional state the ground terminal is connected to the second port via a third current path comprising the first flying capacitor, the second flying capacitor and the inductor.

2. The power converter as claimed in claim 1, wherein the driver is adapted to operate the converter in a second mode associated with a second range of conversion ratios; wherein in the second mode the driver is configured to drive the network of switches with a second sequence of states, the second sequence of states comprising the primary state, the first additional state, and a second additional state, wherein in the second additional state the first-port is coupled to the second port via a path comprising the first flying capacitor and wherein the ground terminal is coupled to the second port via a path comprising the second flying capacitor and the inductor.

3. The power converter as claimed in claim 2, wherein in the second additional state the first-port is coupled to the second port via a path comprising the first flying capacitor and the inductor.

4. The power converter as claimed in claim 2, wherein the driver is adapted to operate the converter in a third mode associated with a third range of conversion ratios; wherein in the third mode the driver is configured to drive the network of switches with a third sequence of states, the third sequence of states comprising the primary state and the second additional state.

5. The power converter as claimed in claim 1, wherein when the power converter operates as a step-down converter the first sequence comprises a de-magnetization state, in which the ground terminal is coupled to the second port via a de-magnetization path comprising the inductor, and when the power converter operates as a step-up converter the first sequence comprises a magnetization state, in which the ground terminal is coupled to the second port via a magnetization path comprising the inductor.

6. The power converter as claimed in claim 4, wherein when the power converter operates as a step-down converter the third sequence comprises a magnetization state, in which the first port is coupled to the second port via a magnetization path comprising the inductor, and when the power converter operates as a step-up converter the third sequence comprises a de-magnetization state, in which the first port is coupled to the second port via a de-magnetization path comprising the inductor.

7. The power converter as claimed in claim 2, wherein the driver is adapted to change a first duration of the primary state, a second duration of the first additional state and a third duration of the second additional state based on the target conversion ratio.

8. The power converter as claimed in claim 6, wherein the driver is adapted to change a duration of the magnetization state or de-magnetization state based on the target conversion ratio.

9. The power converter as claimed in claim 5,
wherein the driver is adapted to change a duration of the de-magnetization state or magnetization state based on the target conversion ratio.

10. The power converter as claimed in claim 1, wherein the network of switches comprises
a first input switch coupled to the first port;
a second input switch to couple the first flying capacitor to the first port via the first input switch;
a first ground switch to couple the first flying capacitor to ground; and
a second ground switch to couple the second flying capacitor to ground;
wherein the inductor has a first terminal and a second terminal the second terminal being coupled to the second port.

11. The power converter as claimed in claim 10, wherein each one of the first flying capacitor and the second flying capacitor has a first terminal selectively coupled to the first port and a second terminal selectively coupled to the ground;
wherein the network of switches comprises
a first capacitor switch coupled to the first terminal of the first flying capacitor;
a second capacitor switch coupled to the second terminal of the first flying capacitor; and
a fourth capacitor switch coupled to the second terminal of the second flying capacitor.

12. The power converter as claimed in claim 11, wherein the first terminal of the inductor is coupled to the first flying capacitor via the second capacitor switch and to the second flying capacitor via the fourth capacitor switch; and wherein the first capacitor switch is coupled to the second port.

13. The power converter as claimed in claim 11, wherein the network of switches comprises a third capacitor switch coupled to the first terminal of the second flying capacitor.

14. The power converter as claimed in claim 13, wherein the network of switches comprises a third input switch to couple the second flying capacitor to the first port via the first input switch.

15. The power converter as claimed in claim 14, wherein the first terminal of the inductor is coupled to the first flying capacitor via the first capacitor switch and the second capacitor switch; the first terminal of the inductor being coupled to the second flying capacitor via the third capacitor switch; and wherein the fourth capacitor switch is coupled to the second port.

16. The power converter as claimed in claim 15 wherein the first flying capacitor is coupled to the second terminal of the inductor via an output switch.

17. A method of converting power with a target conversion ratio the method comprising
providing a power converter having a ground terminal, a first port, and a second port, wherein when the power converter operates as a step-down converter the first port receives an input voltage and the second port provides an output voltage and when the power converter operates as a step-up converter the second port receives an input voltage and the first port provides an output voltage; the power converter further comprising an inductor, a first flying capacitor selectively coupled to the inductor, a second flying capacitor selectively coupled to the inductor, a network of switches;
operating the converter in a first mode associated with a first range of conversion ratios by driving the network of switches with a first sequence of states during a drive period, the first sequence of states comprising a primary state and a first additional state,
wherein in the primary state one of the first port the ground terminal is connected to the second port via a first current path comprising the second flying capacitor and which bypasses the inductor, and wherein the remaining terminal among the first port and the ground terminal is connected to the second port via a second current path comprising the first flying capacitor and the inductor;
wherein in the first additional state the ground terminal is connected to the second port via a third current path comprising the first flying capacitor, the second flying capacitor and the inductor.

18. The method as claimed in claim 17, wherein when the power converter operates as a step-down converter the first sequence comprises a de-magnetization state, in which the ground terminal is coupled to the second port via a de-magnetization path comprising the inductor, and when the power converter operates as a step-up converter the first sequence comprises a magnetization state, in which the ground terminal is coupled to the second port via a magnetization path comprising the inductor.

19. The method as claimed in claim 17, comprising operating the converter in a second mode associated with a second range of conversion ratios by driving the network of switches with a second sequence of states, the second sequence of states comprising the primary state, the first additional state, and a second additional state, wherein in the second additional state the first port is coupled to the second port via a path comprising the first flying capacitor and wherein the ground terminal is coupled to the second port via a path comprising the second flying capacitor and the inductor.

20. The method as claimed in claim 19, wherein in the second additional state the first port is coupled to the second port via a path comprising the first flying capacitor and the inductor.

21. The method as claimed in claim 19, comprising operating the converter in a third mode associated with a third range of conversion ratios by driving the network of switches with a third sequence of states, the third sequence of states comprising the primary state and the second additional state.

22. The method as claimed in claim 21, wherein when the power converter operates as a step-down converter the third sequence comprises a magnetization state, in which the first port is coupled to the second port via a magnetization path comprising the inductor, and when the power converter operates as a step-up converter the third sequence comprises a de-magnetization state, in which the first port is coupled to the second port via a de-magnetization path comprising the inductor.

* * * * *